(12) United States Patent
Shigeta

(10) Patent No.: US 11,663,803 B2
(45) Date of Patent: May 30, 2023

(54) SYSTEM FOR COUNTING QUANTITY OF GAME TOKENS

(71) Applicant: ANGEL GROUP CO., LTD., Shiga (JP)

(72) Inventor: Yasushi Shigeta, Shiga (JP)

(73) Assignee: ANGEL GROUP CO., LTD., Shiga (JP)

( * ) Notice: Subject to any disclaimer, the term of this patent is extended or adjusted under 35 U.S.C. 154(b) by 0 days.

(21) Appl. No.: 16/487,723

(22) PCT Filed: Feb. 21, 2018

(86) PCT No.: PCT/JP2018/006247
§ 371 (c)(1),
(2) Date: Aug. 21, 2019

(87) PCT Pub. No.: WO2018/155497
PCT Pub. Date: Aug. 30, 2018

(65) Prior Publication Data
US 2020/0234464 A1    Jul. 23, 2020

(30) Foreign Application Priority Data

Feb. 21, 2017  (JP) .............................. JP2017-045443

(51) Int. Cl.
*G06V 10/22* (2022.01)
*G07F 17/32* (2006.01)
(Continued)

(52) U.S. Cl.
CPC .......... *G06V 10/225* (2022.01); *G06F 18/214* (2023.01); *G06K 9/6256* (2013.01);
(Continued)

(58) Field of Classification Search
None
See application file for complete search history.

(56) References Cited

U.S. PATENT DOCUMENTS 6,532,297 B1    3/2003   Lindquist
8,454,020 B1 *  6/2013   Orbik ................... A63F 9/0413
                                                       273/268
(Continued)

FOREIGN PATENT DOCUMENTS

CA     2994637 A1    2/2017
CN   109887191 A     6/2019
(Continued)

OTHER PUBLICATIONS

Brahmbhatt, Detecting partially occluded objects in images, Presented to the Faculties of the University of Pennsylvania in Partial Fulllment of the Requirements for the Degree of Master of Science in Engineering. (Year: 2014).*
(Continued)

*Primary Examiner* — Randolph I Chu
(74) *Attorney, Agent, or Firm* — Norton Rose Fulbright US LLP

(57) ABSTRACT

A chip recognition system in which a chip is configured to at least partially have a specific color indicative of a value of the chip includes: a recording device that uses a camera and records a state of the chip as an image; an image analysis device that subjects the image so recorded to image analysis and recognizes at least the specific color and a reference color that is present in the image and differs from the specific color; and a recognition device at least including an artificial intelligence device that uses a result of the image analysis by the image analysis device and specifies the specific color of the chip, wherein the artificial intelligence device of the recognition device has been subjected to teaching using, as training data, a plurality of images of the chip and the reference color irradiated with different illumination intensities.

21 Claims, 6 Drawing Sheets

(51) Int. Cl.
*G06M 11/00* (2006.01)
*G06K 9/62* (2022.01)
*G06T 7/90* (2017.01)
*G06N 20/00* (2019.01)
*G06V 10/56* (2022.01)
*G06F 18/214* (2023.01)
*G06Q 50/34* (2012.01)
*G06T 7/73* (2017.01)
*G06V 10/141* (2022.01)

(52) U.S. Cl.
CPC ............. *G06M 11/00* (2013.01); *G06N 20/00* (2019.01); *G06Q 50/34* (2013.01); *G06T 7/73* (2017.01); *G06T 7/90* (2017.01); *G06V 10/141* (2022.01); *G06V 10/56* (2022.01); *G07F 17/322* (2013.01); *G07F 17/3241* (2013.01); *G07F 17/3248* (2013.01); *G06T 2207/10024* (2013.01); *G06T 2207/20081* (2013.01); *G06T 2207/30242* (2013.01)

(56) References Cited

U.S. PATENT DOCUMENTS

| | | | | |
|---|---|---|---|---|
| 9,361,577 | B2 | 6/2016 | Miyashita | |
| 9,563,824 | B2 | 2/2017 | Maggio et al. | |
| 10,546,457 | B2 * | 1/2020 | Snow | G07F 17/3267 |
| 2002/0045479 | A1 * | 4/2002 | Soltys | G07F 17/32 463/29 |
| 2003/0174864 | A1 * | 9/2003 | Lindquist | G07F 17/32 382/100 |
| 2006/0160608 | A1 * | 7/2006 | Hill | G07F 17/3293 463/25 |
| 2010/0150409 | A1 | 6/2010 | Ferguson | |
| 2014/0232923 | A1 | 8/2014 | Koh et al. | |
| 2017/0039807 | A1 | 2/2017 | Shigeta | |
| 2017/0161987 | A1 | 6/2017 | Bulzacki et al. | |
| 2018/0089532 | A1 * | 3/2018 | Xu | G06K 9/6271 |
| 2018/0114406 | A1 | 4/2018 | Shigeta | |
| 2018/0239984 | A1 | 8/2018 | Shigeta | |
| 2018/0247134 | A1 * | 8/2018 | Bulzacki | G06K 9/00536 |
| 2019/0172311 | A1 | 6/2019 | Shigeta | |
| 2020/0234464 | A1 | 7/2020 | Shigeta | |
| 2022/0364414 | A1 | 11/2022 | Pham et al. | |

FOREIGN PATENT DOCUMENTS

| | | | |
|---|---|---|---|
| JP | S64500243 | A | 2/1989 |
| JP | 2005056004 | A | 3/2005 |
| JP | 2007164401 | A | 6/2007 |
| JP | 2008269334 | A1 | 11/2008 |
| JP | 2009066172 | A | 4/2009 |
| JP | 2016181068 | A | 10/2016 |
| KR | 1020170016303 | A | 2/2017 |
| WO | 1987006372 | A1 | 10/1987 |
| WO | 2015107902 | A1 | 7/2015 |
| WO | 2016191856 | A1 | 12/2016 |
| WO | 2017022767 | A1 | 2/2017 |

OTHER PUBLICATIONS

U.S. Office Action dated Jul. 28, 2020 issued in corresponding/family U.S. Appl. No. 15/900,100.
JP Office Action dated Sep. 15, 2020 issued in corresponding/family application 2017-045443.
International Search Report dated May 22, 2018 issued in corresponding PCT Application PCT/JP2018/006247.
U.S. Office Action dated Oct. 30, 2019 issued in corresponding/family U.S. Appl. No. 15/906,100.
JP Office Action dated Jun. 8, 2021 issued in Japanese application 2017-045443.
U.S. Office Action dated Apr. 14, 2021 issued in U.S. Appl. No. 15/900,100.
Australian Examination report No. 1 dated Mar. 21, 2022 issued in AU application 2018201238.
Chinese Office Action dated Nov. 14, 2022 issued in CN application 201880012611.4.
Korean Office Action dated Feb. 14, 2023 issued in KR application 10-2018-0020481.
U.S. Office Action dated Mar. 31, 2023 issued in U.S. Appl. No. 17/864,627.

* cited by examiner

SYSTEM FOR COUNTING QUANTITY OF GAME TOKENS

CROSS REFERENCE TO RELATED APPLICATION

This application is a national phase application under 35 U.S.C. § 371 of International Application No. PCT/JP2018/006247 filed Feb. 21, 2018, which claims the benefit of JP Application No. 2017-045443 filed Feb. 21, 2017, the entire contents of each of which are hereby incorporated by reference.

TECHNICAL FIELD

The present invention relates to a system for recognizing a large quantity of chips used in a game house type-by-type via images, and counting the quantity of chips type-by-type.

BACKGROUND

Conventionally, in game houses such as casinos, game tokens (referred to hereinafter as "chips") are used for game betting and payout. In order to accurately recognize chips stacked on a table, a method is employed of using cameras and recognizing chips as images. WO 2015/107902 discloses one example of a system for recognizing the in-game movement of chips by using cameras.

When recognizing chips via images by using cameras, it is requested that not only the outlines of the chips be recognized but also the differences in colors of the chips be recognized, and further, that the quantity of chips stacked up be grasped for each type of chip. However, chips recognized by cameras, even if the chips have the same color, are imaged or recognized as having different colors due to the difference in lighting environments in which the chips are placed, and are not recognized as having the same color. Conventionally, it has been thus difficult for example to count the quantity of chips type-by-type from images.

The present invention has been made in view of such a problem, and provides a chip recognition system having a mechanism enabling the recognition of chip color via images and the counting of the quantity of chips even under different lighting environments.

SUMMARY OF THE INVENTION

A chip recognition system according to one aspect of the present invention is a recognition system for recognizing a chip used on a game table of a game house, the chip configured to at least partially have a specific color indicative of a value of the chip, the recognition system including: a recording device that uses a camera and records a state of the chip as an image; an image analysis device that subjects the image so recorded to image analysis and recognizes at least two colors being the specific color and a reference color that is present in the image and differs from the specific color; and a recognition device at least including an artificial intelligence device that uses a result of the image analysis by the image analysis device and specifies the specific color of the chip, wherein the artificial intelligence device of the recognition device has been subjected to teaching using, as training data, a plurality of images of the chip and the reference color irradiated with different illumination intensities.

Furthermore, the chip at least has the specific color, which is indicative of the value of the chip, at a predetermined position or with a predetermined shape.

Furthermore, the recognition device specifies the specific color of the chip to specify a quantity in which the chip is provided. Furthermore, the recognition device may specify specific colors of a plurality of the chips chip-by-chip to specify a quantity of chips of each of the specific colors.

Further, the artificial intelligence device of the recognition device has been subjected to teaching using, as training data, a plurality of images of the reference color and the chip irradiated under different lighting environments. Further, the artificial intelligence device may determine the specific color of the chip by using a relative relation with the reference color.

The recognition device determines specific colors of a plurality of the chips stacked one on top of another, and may be configured to be capable of determining the specific colors or a quantity of the chips even when some of the chips are in hidden state due to a dead angle of the camera.

A recognition system for recognizing an article according to one aspect of the present invention, the article at least partially having, on the article itself or a wrapping of the article, a specific color enabling the article or the wrapping to be specified, includes: a recording device that uses a camera and records a state of the article as an image; an image analysis device that subjects the image so recorded to image analysis and recognizes at least two colors being the specific color and a reference color that is present in the image and differs from the specific color; and a recognition device at least including an artificial intelligence device that uses a result of the image analysis by the image analysis device and specifies the specific color of the article itself or the wrapping, wherein the artificial intelligence device of the recognition device has been subjected to teaching using, as training data, a plurality of images of the reference color and the specific color of the article itself or the wrapping irradiated with different illumination intensities.

Furthermore, the article itself or the wrapping at least partially has the specific color, which enables the article or the wrapping to be specified, at a predetermined position or with a predetermined shape.

Furthermore, the recognition device specifies the specific color of the article itself or the wrapping to specify a quantity in which the article is provided. The recognition device may specify specific colors of a plurality of the articles themselves or the wrappings of the articles article-by-article to specify a quantity of articles of each of the specific colors.

Further, the artificial intelligence device of the recognition device has been subjected to teaching using, as training data, a plurality of images of the reference color and the specific color of the article itself or the wrapping irradiated under different lighting environments. Further, the artificial intelligence device may determine the specific color of the article itself or the wrapping by using a relative relation with the reference color.

Further, the recognition device determines specific colors of a plurality of the articles stacked one on top of another or the wrappings of the articles, and is configured to be capable of determining the specific colors even when some of the articles are in hidden state due to a dead angle of the camera. Further, the recognition device determines specific colors of a plurality of the articles stacked one on top of another or the wrappings of the articles, and is configured to be capable of determining a total quantity of the articles or a quantity of the articles of each of the specific colors even when some of the articles are in hidden state due to a dead angle of the camera.

A chip recognition system pertaining to one aspect of the present invention is: a chip recognition system for recognizing a chip used on a game table of a game house, the chip configured to at least partially have a specific color indicative of the value of the chip, the chip recognition system including: a recording device that uses a camera and records a state of the chip as an image; an image analysis device that subjects the image so recorded to image analysis and recognizes at least two colors being the specific color and a reference color that is present in the image and differs from the specific color; and a recognition device at least including an artificial intelligence device that uses a result of the image analysis by the image analysis device and specifies the specific color of the chip, wherein the artificial intelligence device of the recognition device is configured to extract a center line from the image of the chip and subject, to image analysis, a surrounding image covering a predetermined range centered on the center line to recognize, in the surrounding image, at least two colors being the specific color and the reference color, which differs from the specific color, and has been subjected to teaching using, as training data, a plurality of the surrounding images of the chip and the reference color irradiated with different illumination intensities.

A recognition system for recognizing an article, pertaining to one aspect of the present invention is: a recognition system for recognizing an article, the article at least partially having, on the article itself or a wrapping of the article, a specific color enabling the article or the wrapping to be specified, the recognition system including: a recording device that uses a camera and records a state of the article as an image; an image analysis device that subjects the image so recorded to image analysis and recognizes at least the specific color and a reference color that is present in the image and differs from the specific color; and a recognition device at least including an artificial intelligence device that uses a result of the image analysis by the image analysis device and specifies the specific color of the article itself or the wrapping, wherein the artificial intelligence device of the recognition device is configured to recognize the specific color from the image of the article itself or the wrapping, extract an image portion having the specific color, and subject a surrounding image of the specific color to image analysis to recognize, in the surrounding image, at least two colors being the specific color and the reference color, and has been subjected to teaching using, as training data, a plurality of the surrounding images of the specific color of the article itself or the wrapping and the reference color irradiated with different illumination intensities.

The present invention enables the recognition of chips used on a game table type-by-type and the counting of the quantity of the chips from images.

DETAILED DESCRIPTION OF EMBODIMENTS

Figure 1:
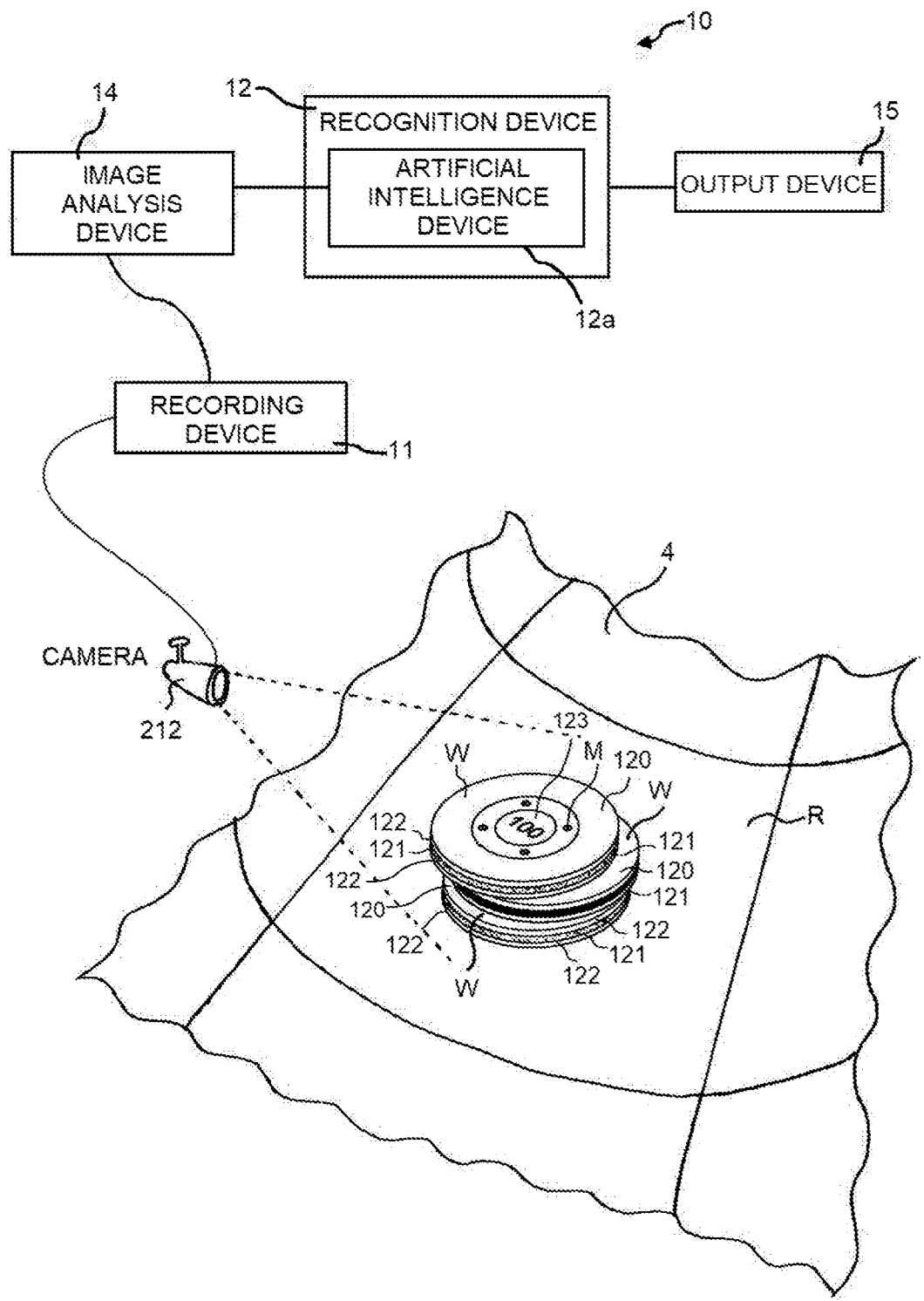
FIG. 1 schematically illustrates a chip recognition system in an embodiment of the present invention.

The following describes embodiments of the present invention in detail, with reference to the attached drawings. Note that the same symbols are provided to constituent elements having equivalent functions in the drawings, and detailed description regarding constituent elements provided with the same symbol is not repeated.

FIG. 1 schematically illustrates a chip recognition system 10 in an embodiment of the present invention. As illustrated in FIG. 1, in the present embodiment, a camera 212 for imaging a state of chips W stacked one on top of another on a game table 4 is provided at the outside of the game table 4.

Figure 2:
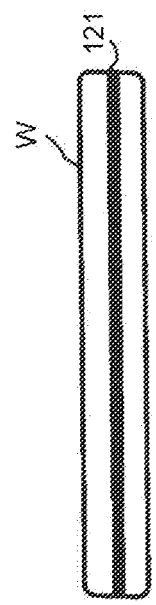
FIG. 2 is a lateral view of a chip in an embodiment of the present invention.

In the chip recognition system 10 according to the present embodiment, a chip W is configured to at least partially have a specific color 121 indicative of the value thereof, as illustrated in FIG. 2. Further, the chip recognition system 10 according to the present embodiment includes: a recording device 11 that uses the camera 212 and records a state of the chip W as an image; an image analysis device 14 that subjects the image so recorded to image analysis and recognizes at least the specific color 121 and a reference color R that is present in the image and differs from the specific color 121; and a recognition device 12 at least including an artificial intelligence device 12a that uses a result of the image analysis by the image analysis device 14 and specifies the specific color 121 of the chip W, wherein the artificial intelligence device 12a of the recognition device 12 has been subjected to teaching using, as training data, a plurality of images of the chip W and the reference color R irradiated with different illumination intensities.

Note that the chip recognition system 10 according to the present embodiment is connected in communicable state with respect to the camera 212.

Figure 3:
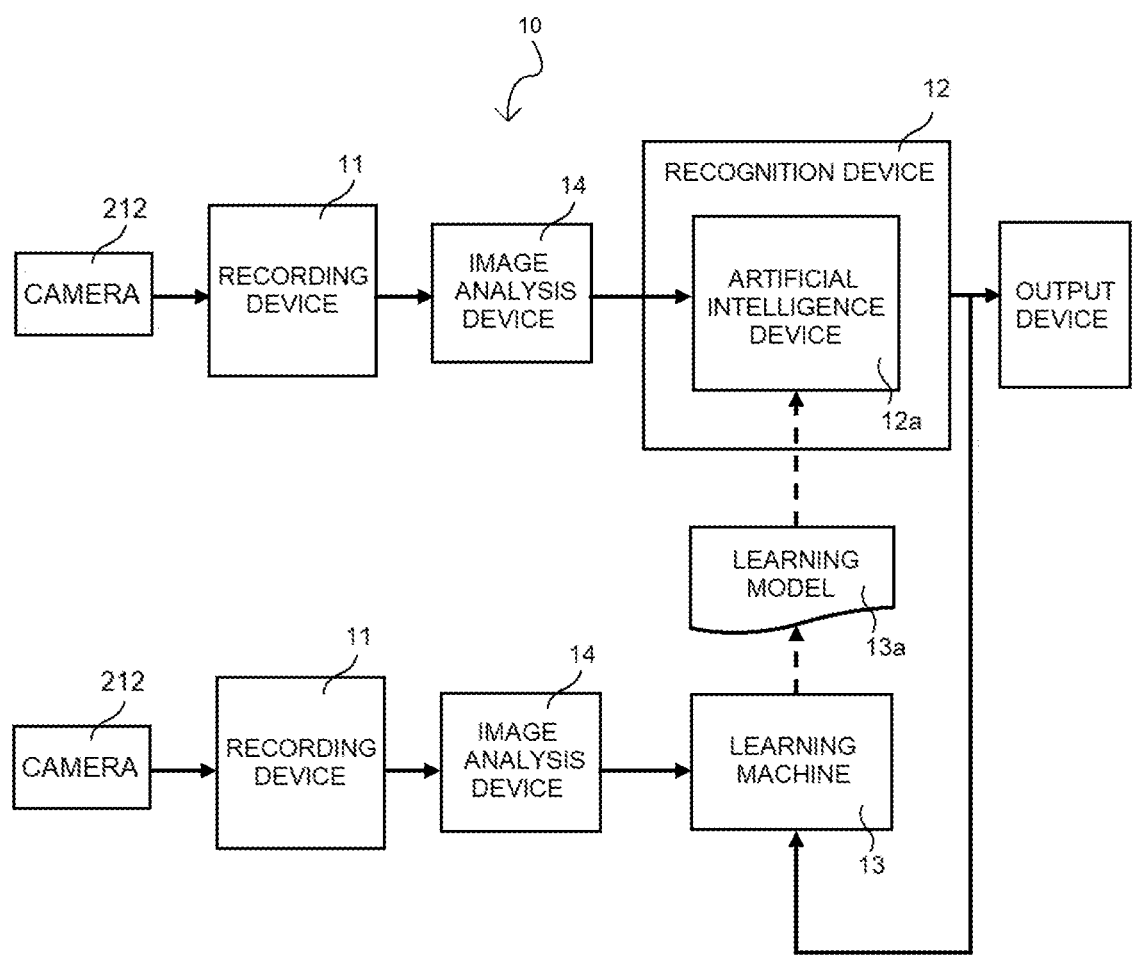
FIG. 3 is a block diagram illustrating a schematic configuration of a chip recognition system in an embodiment of the present invention.

FIG. 3 is a block diagram illustrating a schematic configuration of the chip recognition system 10 according to the present embodiment.

As illustrated in FIG. 3, the chip recognition system 10 includes: the recording device 11; the recognition device 12; a learning machine 13; and the image analysis device 14. Note that at least part of the chip recognition system 10 is realized by using a computer.

The recording device 11 includes a stationary data storage such as a hard disk, for example. The recording device 11 records a state of a chip W stacked on the game table 4 as an image captured by the camera 212. Note that the image may be a moving image or may be successive still images.

The recording device 11 may append an index or time with respect to the image acquired from the camera 212, so that imaging history can be later analyzed by the later-described recognition device.

The image analysis device 14 subjects the image recorded by the recording device 11 to image analysis and recognizes at least two colors being the specific color 121, which is at least partially provided to the chip W, and the reference color R that is present in the image and differs from the specific color 121. Note that the specific color 121 is provided at least partially to the chip W at a predetermined position or with a predetermined shape. For example, the specific color 121 may be provided on a lateral surface of the chip W in the circumferential direction, or may be provided as a predetermined mark on a surface of the chip W. Meanwhile, the reference color R may for example be a color of a specific area of the game table 4 or a color provided to a position of the chip W differing from the position of the specific color 121.

The recognition device 12 includes the artificial intelligence device 12a, which uses the result of the image analysis by the image analysis device 14 and specifies the specific color 121 by using deep learning technology, for example. The recognition device 12 determines the quantity and types of the chips W placed on the game table 4. The recognition device 12 may further determine the positions of the chips W on the game table 4.

As illustrated in FIG. 3, the recognition device 12 outputs a result of the determination to an output device 15. The output device 15 may output the determination result received from the recognition device 12 as text information to a monitor above the game table 4, etc.

In the present embodiment, the learning machine 13 acquires, via the image analysis device 14, a plurality of images, recorded by the recording device 11, of the chip W and the reference color R irradiated with different illumination intensities. Further, the learning machine 13 undergoes learning by being subjected to teaching by a person using the acquired images and the correct colors of the specific color 121 of the chip W and the reference color R in the respective images as training data, and creates a learning model 13a (recognition program). Note that the relative relation between the specific color 121 and the reference color R can be acquired from images of the chip W and the reference color R irradiated with illumination intensities of the same condition, due to the specific color 121 and the reference color R being irradiated with the same illumination intensity. This relative relation, for example, may be utilized in the recognition of the specific color 121. Images each of which was acquired by irradiating from different irradiation angles or images each of which was created by arbitrarily changing the distribution of RGB values of the acquired images may be used as training data.

By a teaching operation being repeated in which a person inputs the above-described training data to the learning machine 13 and causes the learning machine 13 to undergo learning, the accuracy of specification of the specific color 121 of the chip W by the learning model 13a possessed by the learning machine 13 can be improved. The learning machine 13 is capable of creating a learning model 13a with which it is possible to determine specific colors 121 of a plurality of chips W placed on the game table 4 even when some of the chips Won the game table 4 are in hidden state due to a dead angle of the camera 212, by repeating learning of such images in advance.

The learning model 13a so created can be input to the artificial intelligence device 12a via an external medium such as a USB memory, a HDD, etc., or a communication network, etc.

Further, as illustrated in FIG. 3, images of the chip W and the reference color R, and the result of the determination by the recognition device 12 may be input to the learning machine 13 as training data.

Note that various modifications can be made based on the above-described embodiment. The following describes one example of a modification, with reference to the drawings. Note that in the following description and the drawings used in the following description, the same symbols as used for the corresponding portions in the above-described embodiment are used for portions that could be configured similarly to the above-described embodiment, and redundant description is also omitted.

Figure 4:
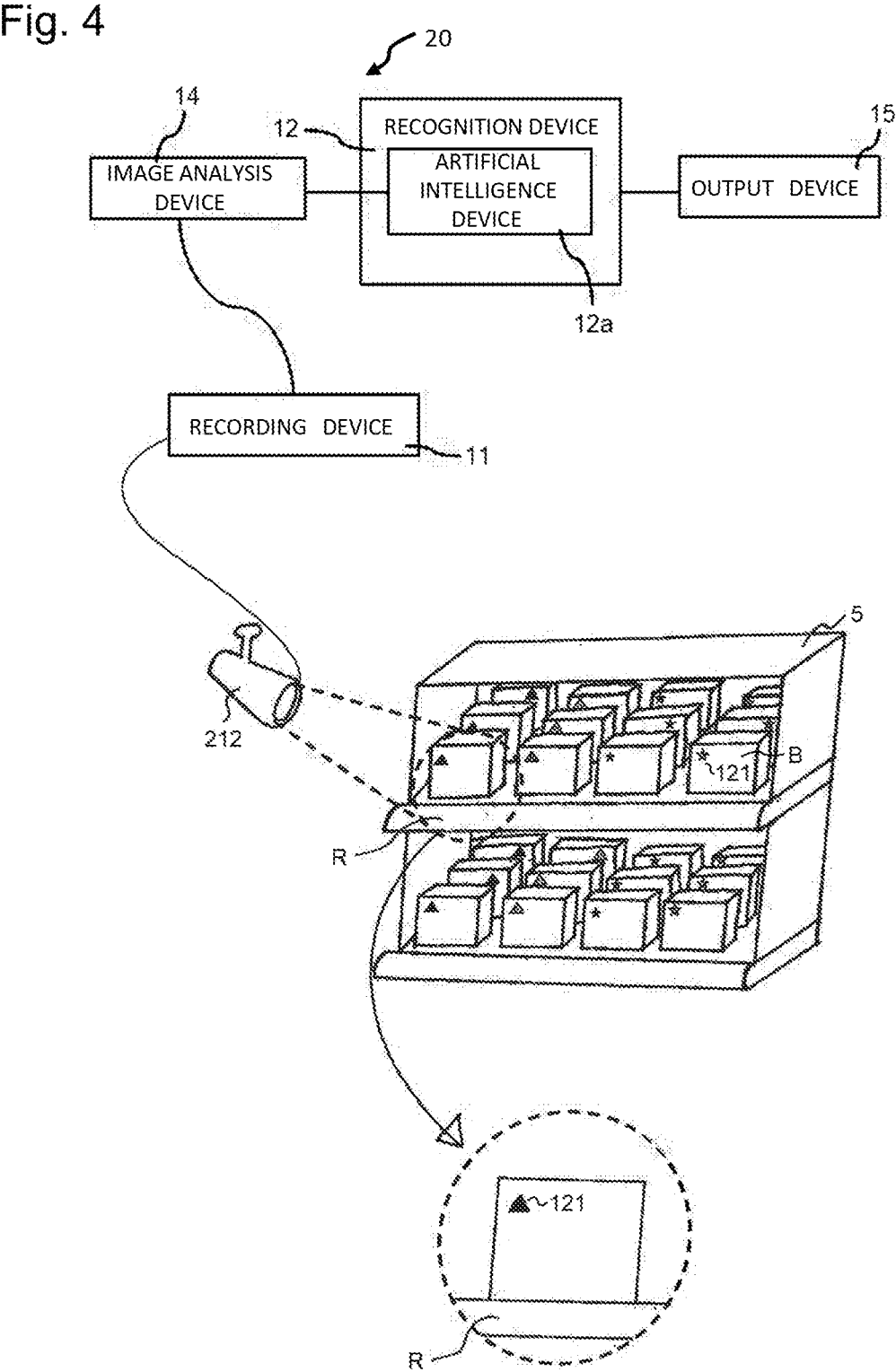
FIG. 4 schematically illustrates an article recognition system in another embodiment of the present invention.

FIG. 4 schematically illustrates an article recognition system 20 in another embodiment of the present invention. As illustrated in FIG. 4, in the present embodiment, a camera 212 for imaging a state of articles B placed on an article display shelf 5 is provided at the outside of the article display shelf 5.

Further, in the article recognition system 20 according to the present embodiment, an article B is configured to at least partially have a specific color 121 on the article itself or a wrapping of the article. The specific color 121 enables the article or the wrapping to be specified. Further, the article recognition system 20 according to the present embodiment includes: a recording device 11 that uses the camera 212 and records a state of the article B as an image; an image analysis device 14 that subjects the image so recorded to image analysis and recognizes at least two colors being the specific color 121 and a reference color R that is present in the image and differs from the specific color 121; and a recognition device 12 at least including an artificial intelligence device 12a that uses a result of the image analysis by the image analysis device 14 and specifies the specific color 121 of the article B, wherein the artificial intelligence device 12a of the recognition device 12 has been subjected to teaching using, as training data, a plurality of images of the reference color R and the specific color 121 of the article B itself or the wrapping irradiated with different illumination intensities.

Note that the article recognition system 20 according to the present embodiment is connected in communicable state with respect to the camera 212.

The article recognition system 20 includes: the recording device 11; the recognition device 12; a learning machine 13; and the image analysis device 14. Note that at least part of the article recognition system 20 is realized by using a computer.

The recording device 11 includes a stationary data storage such as a hard disk, for example. The recording device 11 records a state of an article B placed on the article display shelf 5 as an image captured by the camera 212. Note that the image may be a moving image or may be successive still images.

The recording device 11 may append an index or time with respect to the images acquired from the camera 212, so that imaging history can be later analyzed by the later-described recognition device.

The image analysis device 14 subjects the image recorded by the recording device 11 to image analysis and recognizes at least two colors being the specific color 121, which is at least partially provided to the article B, and the reference color R, which is present in the image and differs from the specific color 121. The specific color 121, which is provided to the article B itself or a wrapping thereof, is at least partially provided to the article B itself or the wrapping thereof at a predetermined position or with a predetermined shape, and may be provided at any position of the article B itself or the wrapping thereof and may have various shapes. Meanwhile, the reference color R may for example be a color of a part of a frame of the article display shelf 5 or a color of a wall in the background.

The recognition device 12 includes the artificial intelligence device 12a, which uses the result of the image analysis by the image analysis device 14 and specifies the specific color 121 by using deep learning technology, for example. The recognition device 12 determines the quantity and types of articles B placed on the article display shelf 5.

The recognition device 12 may further determine the positions of the articles B placed on the article display shelf 5.

In the present embodiment, the learning machine 13 acquires, via the image analysis device 14, a plurality of images, recorded by the recording device 11, of the article B itself or the wrapping thereof and the reference color R irradiated with different illumination intensities. Further, the learning machine 13 undergoes learning by being subjected to teaching by a person using the acquired images and the correct colors of the specific color 121 provided to the article B itself or the wrapping thereof and the reference color R in the respective images as training data, and creates a learning model 13a (recognition program). Note that the relative relation between the specific color 121 and the reference color R can be acquired from images of article B and the reference color R irradiated with illumination intensities of the same condition, due to the specific color 121 and the reference color R being irradiated with the same illumination intensity. This relative relation, for example, may be utilized in the recognition of the specific color 121. Images each of which was acquired by irradiating from different irradiation angles or images each of which was created by arbitrarily changing the distribution of RGB values of the acquired images may be used as training data.

By a teaching operation being repeated in which a person inputs the above-described training data to the learning machine 13 and causes the learning machine 13 to undergo learning, the accuracy of specification of the specific color 121 provided to the article B itself or the wrapping thereof by the learning model 13a possessed by the learning machine 13 can be improved. The learning machine 13 is capable of creating a learning model 13a with which it is possible to determine specific colors 121 of a plurality of articles B placed on the article display shelf 5 even when some of the articles B on the article display shelf 5 are in hidden state due to a dead angle of the camera 212, by repeating learning of such images in advance.

The learning model 13a so created can be input to the artificial intelligence device 12a via an external medium such as a USB memory, a HDD, etc., or a communication network, etc.

Further, as illustrated in FIG. 3, images of the specific color 121 of the article B or the wrapping thereof and the reference color R, and the result of the determination by the recognition device 12 may be input to the learning machine 13 as training data.

Figure 5:
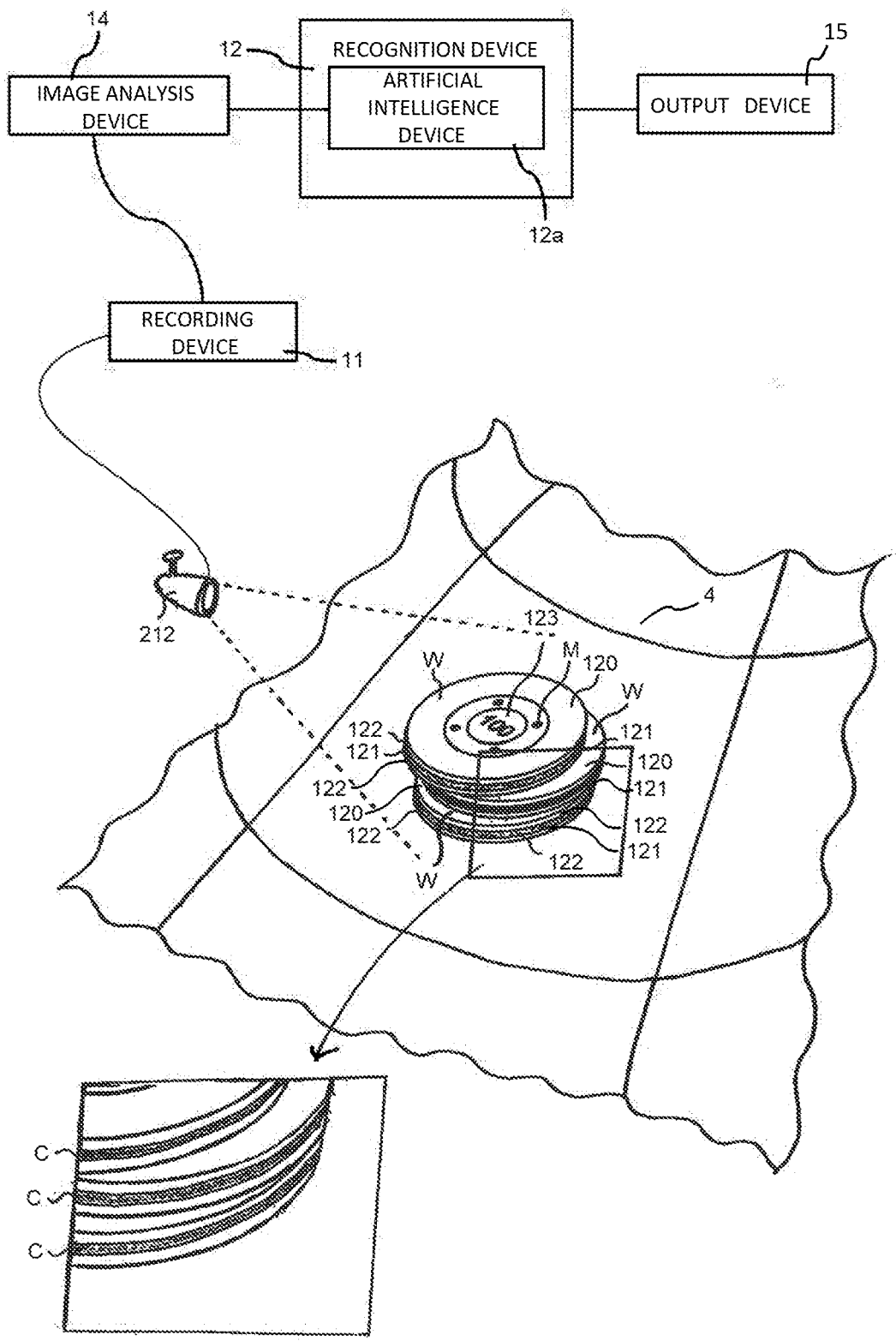
FIG. 5 is a diagram for explaining another example for determining chip color.

FIG. 5 schematically illustrates another example for determining chip color. In the present embodiment, the artificial intelligence device 12a of the recognition device 12 extracts a center line C of a chip W from an image of the chip W by using artificial intelligence.

Specifically, as illustrated in FIG. 3, the learning machine 13 acquires, via the image analysis device 14, a plurality of images, recorded by the recording device 11, of the center line C of the chip W irradiated with different illumination intensities. Further, the learning machine 13 undergoes learning by being subjected to teaching by a person using the acquired images and the correct positions of the center line C of the chip W in the respective images as training data, and creates a learning model 13a (recognition program).

By a teaching operation being repeated in which a person inputs the above-described training data to the learning machine 13 and causes the learning machine 13 to undergo learning, the accuracy of specification of the center line C of the chip W by the learning model 13a possessed by the learning machine 13 can be improved. The learning machine 13 is capable of creating a learning model 13a with which it is possible to determine center lines C of a plurality of chips W placed on the game table 4 even when some of the chips W on the game table 4 are in hidden state due to a dead angle of the camera 212, by repeating learning of such images in advance.

The learning model 13a so created is input to the artificial intelligence device 12a via an external medium such as a USB memory, a HDD, etc., or a communication network, etc., whereby the artificial intelligence device 12a becomes capable of extracting the center line C of the chip W from the image of the chip W by using artificial intelligence.

Note that image analysis of the center line C from the image may be performed by analyzing the image in its original state or after subjecting the image to image processing such as color emphasis, noise removal, etc., in order to facilitate the recognition of the center line C.

Further, the recognition device 12, without using artificial intelligence, may extract the center line C of the chip W through a method of using the result of the imaging by the camera 212, the recording as the image, and further the image analysis, and measuring image features such as shapes, brightness, chroma, and hue.

Figure 6:
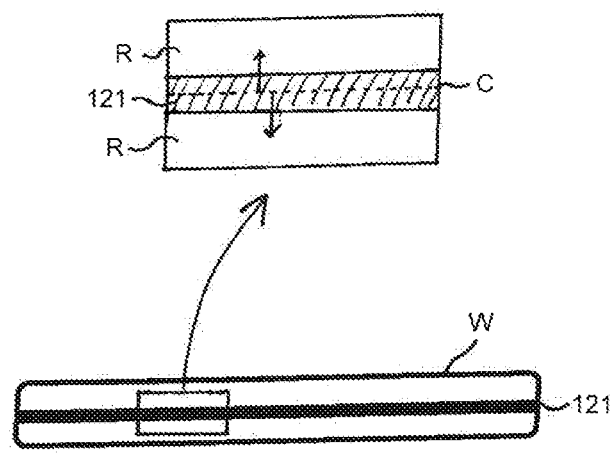
FIG. 6 includes a lateral view of a chip and an enlarged diagram thereof.

As illustrated in FIG. 6, the artificial intelligence device 12a is further configured to subject, to image analysis, a surrounding image covering a predetermined range around the extracted center line C (for example, a range centered on the center line C and corresponding to eight pixels perpendicular to the center line C) to recognize, in the surrounding image, at least two colors being the specific color 121 and the reference color R, which differs from the specific color 121. Note that image analysis of the surrounding image of the predetermined range around the extracted center line C may be performed by analyzing the image in its original state or after subjecting the image to image processing such as color emphasis, noise removal, etc., in order to facilitate the recognition of the specific color 121.

The artificial intelligence device 12a has been subjected to teaching using, as training data, a plurality of images of the chip W and the reference color R irradiated with different illumination intensities. Note that the relative relation between the specific color 121 and the reference color R can be acquired from surrounding images of the center line C of the chip W irradiated with illumination intensities of the same condition, due to the specific color 121 and the reference color R being irradiated with the same illumination intensity. This relative relation, for example, may be utilized in the recognition of the specific color 121.

Further, the recognition device 12, without using artificial intelligence, may recognize the specific color 121 through a method of using the result of the imaging by the camera 212, the recording as the image, and further the image analysis, and measuring image features such as shapes, brightness, chroma, and hue.

In summary, the artificial intelligence device 12a of the recognition device 12 is configured to extract a center line C from an image of a chip W and subject, to image analysis, a surrounding image covering a predetermined range centered on the center line C to recognize, in the surrounding image, at least two colors being a specific color 121 and a reference color R, which differs from the specific color 121, and has been subjected to teaching using, as training data, a plurality of the surrounding images of the chip W and the reference color R irradiated with different illumination intensities.

In another embodiment for determining an article, the artificial intelligence device 12a of the article recognition device 12 extracts a specific color 121 of an article B itself or a wrapping of the article B from an image of the article B itself or the wrapping thereof by using artificial intelligence.

Specifically, as illustrated in FIG. 3, the learning machine 13 acquires, via the image analysis device 14, a plurality of images, recorded by the recording device 11, of the article B itself or the wrapping thereof and the reference color R irradiated with different illumination intensities. Further, the learning machine 13 undergoes learning by being subjected to teaching by a person using the acquired images and the correct positions of the specific color 121 provided to the article B itself or the wrapping thereof in the respective images as training data, and creates a learning model 13a (recognition program).

By a teaching operation being repeated in which a person inputs the above-described training data to the learning machine 13 and causes the learning machine 13 to undergo learning, the accuracy of specification of the specific color 121 provided to the article B itself or the wrapping thereof by the learning model 13a possessed by the learning machine 13 can be improved. The learning machine 13 is capable of creating a learning model 13a with which it is possible to determine specific colors 121 of a plurality of articles B placed on the article display shelf 5 even when some of the articles B on the article display shelf 5 are in hidden state due to a dead angle of the camera 212, by repeating learning of such images in advance.

The learning model 13a so created is input to the artificial intelligence device 12a via an external medium such as a USB memory, a HDD, etc., or a communication network, etc., whereby the artificial intelligence device 12a becomes capable of extracting a portion having the specific color 121 provided to the article B itself or the wrapping thereof from the image of the article B by using artificial intelligence.

Note that image analysis of the portion having the specific color 121 from the image may be performed by analyzing the image in its original state or after subjecting the image to image processing such as color emphasis, noise removal, etc., in order to facilitate the recognition of the portion having the specific color 121.

Further, the recognition device 12, without using artificial intelligence, may recognize the portion having the specific color 121 of the article B itself or the wrapping thereof through a method of measuring image features such as shapes, brightness, chroma, and hue.

The artificial intelligence device 12a is further configured to subject, to image analysis, a surrounding image covering a predetermined range around the portion having the specific color 121 (for example, a range corresponding to eight pixels around the portion having the specific color 121) to recognize, in the surrounding image, at least two colors being the specific color 121 and the reference color R, which differs from the specific color 121. Note that image analysis of the surrounding image of the predetermined range around the portion having the specific color 121 may be performed by analyzing the image in its original state or after subjecting the image to image processing such as color emphasis, noise removal, etc., in order to facilitate the recognition of the portion having the specific color 121.

The artificial intelligence device 12a has been subjected to teaching using, as training data, a plurality of images of the portion having the specific color 121 of the article B itself or the wrapping thereof and the reference color R irradiated with different illumination intensities. Note that the relative relation between the specific color 121 and the reference color R can be acquired from surrounding images of the portion having the specific color 121 of the article B itself or the wrapping thereof irradiated under illumination intensities of the same condition, due to the specific color 121 and the reference color R being irradiated with the same illumination intensity. This relative relation, for example, may be utilized in the recognition of the specific color 121. Images each of which was acquired by irradiating from different irradiation angles or images each of which was created by arbitrarily changing the distribution of RGB values of the acquired images may be used as training data.

Further, the recognition device 12, without using artificial intelligence, may recognize the specific color 121 through a method of using the result of the imaging by the camera 212, the recording as the image, and further the image analysis, and measuring image features such as shapes, brightness, chroma, and hue.

In summary, the artificial intelligence device 12a of the recognition device 12 is configured to recognize a specific color 121 from an image of an article B itself or a wrapping thereof, extract an image portion having the specific color 121, and subject a surrounding image of the specific color 121 to image analysis to recognize, in the surrounding image, at least two colors being the specific color 121 and the reference color R, and has been subjected to teaching using, as training data, a plurality of the surrounding images of the specific color 121 of the article B itself or the wrapping thereof and the reference color R irradiated with different illumination intensities.

The above-described embodiments are disclosed for the purpose of allowing those having ordinary knowledge in the technical field to which the present invention belongs to implement the present invention. Those skilled in the art could naturally make various modifications of the above-described embodiments, and the technical concept of the present invention is also applicable to other embodiments. Accordingly, the present invention is not limited to the embodiments disclosed herein, and shall be construed as having the broadest scope in accordance with the technical concept defined by the patent claims.

DESCRIPTION OF THE REFERENCE NUMERALS

4 Game Table
5 Output Device
10 Chip Recognition System
11 Recording Device
12 Recognition Device
12a Artificial Intelligence Device
13 Learning Machine
13a Learning Model
14 Image Analysis Device
15 Output Device
20 Article Recognition System
121 Specific Color
212 Camera
W Chip
B Article
R Reference Color
C Center Line

What is claimed is:

1. A recognition system for recognition of a chip used on a game table of a game house, the chip having a specific color indicative of a value of the chip, the recognition system comprising:
a recording device configured to record an image having therein a first area of the specific color of the chip and a second area of a reference color; and at least one processor configured to use an artificial intelligence function to analyze the image, wherein analysis of the image includes:
  recognizing, in a representation of the chip in the image, a presence of the specific color, and
  identifying the value of the chip based on the specific color, and
  wherein the artificial intelligence function is trained on a plurality of images, each image of the plurality of images including the specific color and the reference color captured under different illumination conditions with respect to the other images of the plurality of images.

2. The recognition system according to claim 1, wherein the at least one processor is configured to identify the specific color and the value when the chip includes the specific color at a predetermined position or with a predetermined shape, wherein the second area of the reference color includes an area other than the chip, and wherein the area other than the chip includes a game table.

3. The recognition system according to claim 1, wherein the at least one processor is configured to determine a quantity of instances of the chip that are present based on recognition of the presence of the specific color.

4. The recognition system according to claim 1, wherein the at least one processor is configured to identify respective specific colors of a plurality of instances of the chip, instance-by-instance, to determine a respective quantity of a plurality of chips each of the specific colors.

5. The recognition system according to claim 1, wherein the plurality of images used for training of the artificial intelligence function are of the reference color and of the chip having the specific color irradiated under different lighting environments.

6. A recognition system for recognition of an article, based on a specific color that is on the article itself or a wrapping of the article, the recognition system comprising:
  a recording device configured to record an image having therein a first area of the specific color and a second area of a reference color; and
  at least one processor configured to use an artificial intelligence function to analyze the image, wherein analysis of the image includes:
    recognizing, in a representation of the article or of the wrapping in the image, a presence of the specific color, and
    identifying the specific color of the article or of the wrapping based on the specific color, and
    wherein the artificial intelligence function is trained on a plurality of images, each image of the plurality of images including the specific color and the reference color captured under different illumination conditions with respect to the other images of the plurality of images.

7. The recognition system according to claim 6, wherein the at least one processor is configured to identify the specific color when the article itself or wrapping includes the specific color at a predetermined position or with a predetermined shape, wherein the second area of the reference color includes an area other than the article or the wrapping, and wherein the area other than the article or the wrapping includes a background wall.

8. The recognition system according to claim 6, wherein the at least one processor is configured to determine a quantity of instances of the article that are present based on recognition of the presence of the specific color.

9. The recognition system according to claim 6, wherein the plurality of images used for training of the artificial intelligence function are of the reference color and of the article having the specific color on itself or on its wrapping irradiated under different lighting environments.

10. The recognition system according to claim 6, wherein, for a plurality of articles stacked one on top of another, the at least one processor is configured to determine respective specific colors of the articles or of their wrappings even when some of the plurality of the articles are in a hidden state due to a dead angle of the recording device.

11. The recognition system according to claim 6, wherein, for a plurality of articles stacked one on top of another, the at least one processor is configured to:
  determine respective specific colors of the articles or of their wrappings; and
  determine a total quantity of the articles or respective quantities of the articles for each of the specific colors even when some of the plurality of the articles are in a hidden state due to a dead angle of the recording device.

12. The recognition system according to claim 1, wherein the at least one processor is configured to determine respective specific colors or a quantity of a plurality of chips stacked one on top of another even when some of the plurality of chips are in a hidden state due to a dead angle of the recording device.

13. The recognition system according to claim 8, wherein the at least one processor is configured to identify respective specific colors of the plurality of the instances of the article, instance-by-instance, to determine a respective quantity of the instances for each of the specific colors.

14. The recognition system according to claim 1, wherein the reference color is distinct from the chip.

15. The recognition system according to claim 1, wherein the at least one processor is configured to identify the specific color and the value when the chip includes the specific color at a predetermined position or with a predetermined shape.

16. The recognition system according to claim 1, wherein the at least one processor is configured to identify the specific color and the value when the chip includes the specific color at a predetermined position and with a predetermined shape.

17. The recognition system according to claim 1, wherein the second area of the reference color includes an area other than the chip.

18. The recognition system according to claim 1, wherein the reference color includes a color of a surface of a game table.

19. The recognition system according to claim 6, wherein the at least one processor is configured to identify the specific color when the article itself or wrapping includes the specific color at a predetermined position or with a predetermined shape.

20. The recognition system according to claim 6, wherein the second area of the reference color includes an area other than the article or the wrapping.

21. The recognition system according to claim 20, wherein the area other than the article or the wrapping includes a background wall.

* * * * *